Jan. 22, 1935.  T. V. BUCKWALTER  1,988,830
CONNECTING ROD
Filed Aug. 28, 1933
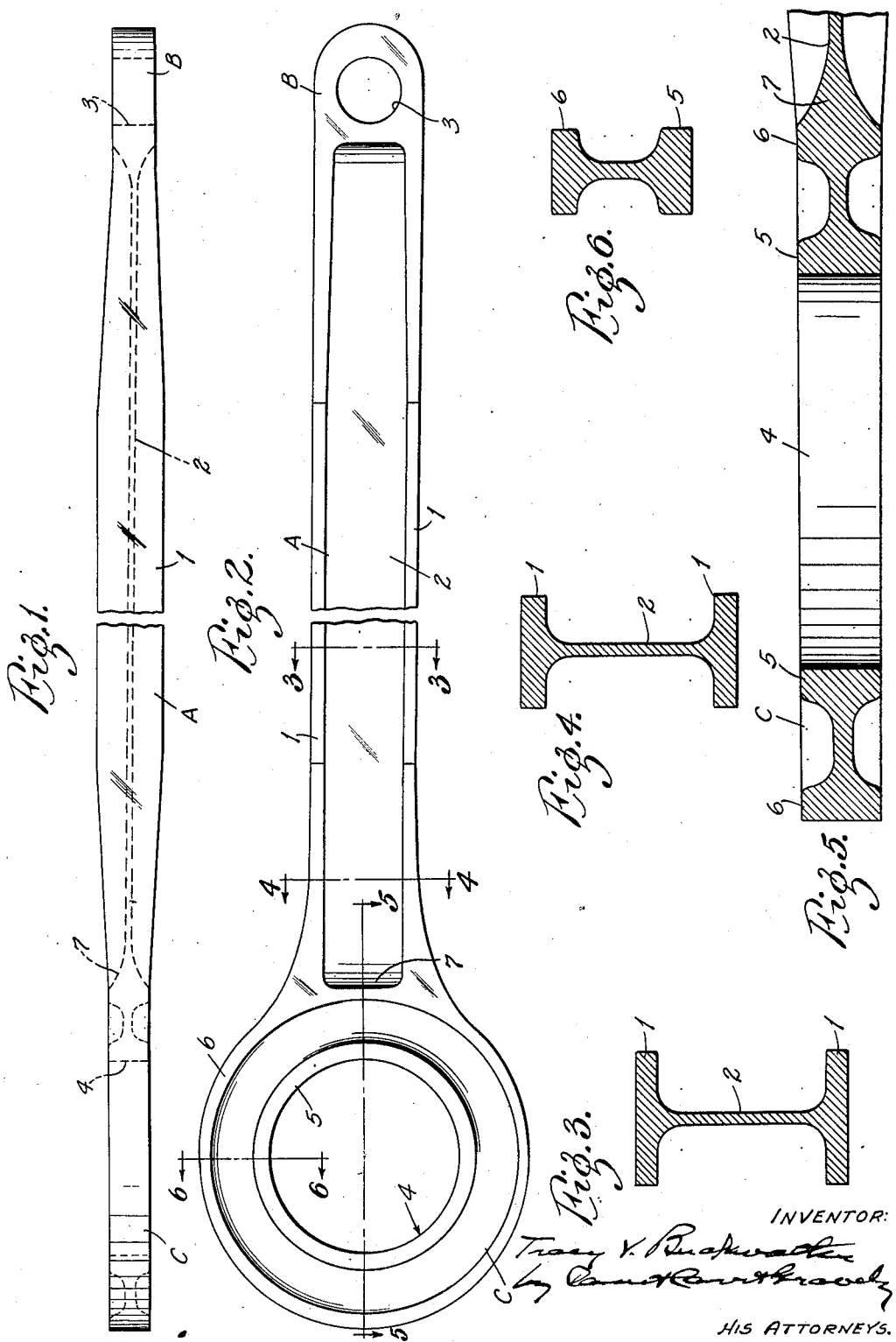
INVENTOR:
Tracy V. Buckwalter
HIS ATTORNEYS.

Patented Jan. 22, 1935

1,988,830

UNITED STATES PATENT OFFICE 1,988,830

CONNECTING ROD

Tracy V. Buckwalter, Canton, Ohio, assignor to The Timken Roller Bearing Company, Canton, Ohio, a corporation of Ohio Application August 28, 1933, Serial No. 687,033

4 Claims. (Cl. 74—579)

This invention relates principally to main or connecting rods for locomotives. It has for its principal objects to reduce the weight of the rod and to increase its strength and rigidity and the resistance of its enlarged crank pin receiving end to deformation. The invention consists in the connecting rod hereinafter described and claimed.

In the accompanying drawing, which forms part of this specification and wherein like symbols refer to like parts wherever they occur, Fig. 1 is a plan view of a locomotive main rod embodying my invention, Fig. 2 is a side elevation of said main rod, Fig. 3 is a cross-section through the shank portion of said rod midway of the ends thereof on the line 3—3 in Fig. 2, Fig. 4 is a similar cross-section on the line 4—4 in Fig. 2 through the shank portion of said rod adjacent to the main bearing end thereof, Fig. 5 is a longitudinal section through the main bearing end of said rod on the line 5—5 in Fig. 2; and Fig. 6 is a cross-section on the line 6—6 in Fig. 2.

Referring to the accompanying drawing, my invention is shown in connection with a connecting or main rod for a locomotive. The rod is of integral construction and comprises a shank or body portion A, which is substantially I-shape in cross-section; that is, said shank portion comprises spaced parallel side flanges 1 that are connected by a medial web 2. The side flanges 1 of the shank or main body portion A of the rod are widest along the middle portion of the rod and taper in width towards the ends thereof. The cross-head pin end B of the rod is of conventional shape and has the usual cross-head pin receiving opening 3 extending therethrough. The other or crank pin end C of the rod is enlarged and has a crank pin opening 4 extending therethrough.

The crank pin opening 4 is surrounded by spaced annular inner and outer flanges 5 and 6, respectively. The annular inner flange 5 defines the crank pin opening 4; and the outer annular flange 6 forms the peripheral edge of the enlarged rod end C and merges into the longitudinal side flanges 1 of the shank A and bridges the space between the adjacent ends of the two shank flanges. The annular flanges 5 and 6 are of less width than the shank flanges 1, which decrease in width from the wide intermediate portion thereof to the points where they merge into the outer annular flange 6. The web 2 of the shank portion A is preferably widened out, as at 7, as it joins the portion of the annular outer flange 6 that bridges the space between the two shank flanges 1.

The hereinbefore described connecting rod has numerous advantages. The shape of the shank portion of the rod is well adapted to prevent bending or buckling thereof in service; and the continuous annular outer flange 7 merges into the side flanges of the shank portion of the rod and bridges the space therebetween and thus relieves the annular inner flange 6, which defines the crank pin opening, of stresses which tend to distort said flange. This additional strength afforded by the annular outer flange enables the opening 4 to be made large enough to accommodate a roller bearing without danger of distorting said opening and the bearing therein.

The two annular flanges 6 and 7 cooperate with the web of the rod to form a continuous I-shaped section around the crank pin opening which section greatly reduces the weight of the crank pin end of the rod so that there is no difficulty in obtaining the proper rod counterbalance on the wheel. The shape of the rod permits it to be easily and cheaply produced by drop-forging; and it is properly proportioned for heat treatment and for obtaining the proper grain flow of the metal.

What I claim is:

1. A locomotive connecting rod comprising an integral body portion provided with longitudinal side flanges and an integral enlarged end having an opening extending therethrough adapted to receive a roller bearing, an annular flange defining said opening, and a continuous flange spaced from and completely surrounding said annular flange and forming a connecting bridge between the adjacent ends of said longitudinal side flanges, thereby relieving the first mentioned flange of stresses tending to distort it.

2. A locomotive connecting rod comprising an integral body portion provided with longitudinal side flanges and an enlarged end having an opening extending therethrough adapted to receive a roller bearing, and a plurality of spaced annular flanges surrounding said opening and connected by an integral web portion, the annular inner flange defining said opening and the annular outer flange forming the peripheral edge of said enlarged end portion and also bridging the space between said longitudinal side flanges.

3. A locomotive connecting rod comprising an integral shank portion provided with an enlarged end portion having an opening extending therethrough adapted to receive a roller bearing, and a plurality of spaced annular flanges surrounding said opening, the shank portion of said rod being provided with longitudinal side flanges that merge into said annular outer flange, the annular inner flange defining said opening and the annular outer flange forming the peripheral edge of said enlarged end portion and also forming a bridge between said shank flanges.

4. A locomotive connecting rod comprising an integral shank portion provided with an enlarged end portion having an opening extending therethrough adapted to receive a roller bearing, and a plurality of spaced annular flanges surrounding said opening there being an integral web between said flanges, the shank portion of said rod being provided with longitudinal side flanges that merge into said annular outer flange, the annular inner flange defining said opening and the annular outer flange forming the peripheral edge of said enlarged end portion and also forming a bridge between the adjacent ends of said shank flanges, said shank flanges being of greater width midway of the ends thereof than the width of said annular outer flange.

TRACY V. BUCKWALTER.